United States Patent
Hsu et al.

(10) Patent No.: US 10,003,512 B2
(45) Date of Patent: Jun. 19, 2018

(54) WIRELESS COMMUNICATION METHOD SUPPORTING REVERSE REPORT AND RELATED WIRELESS COMMUNICATION SYSTEM

(71) Applicant: MEDIATEK INC., Hsin-Chu (TW)

(72) Inventors: Tsai-Yuan Hsu, Hsinchu County (TW); Chao-Chun Wang, Taipei (TW)

(73) Assignee: MEDIATEK INC., Hsin-Chu (TW)

(*) Notice: Subject to any disclaimer, the term of this patent is extended or adjusted under 35 U.S.C. 154(b) by 86 days.

(21) Appl. No.: 15/059,308

(22) Filed: Mar. 3, 2016

(65) Prior Publication Data

US 2016/0262037 A1     Sep. 8, 2016

Related U.S. Application Data

(60) Provisional application No. 62/128,530, filed on Mar. 5, 2015.

(51) Int. Cl.
*H04J 3/06* (2006.01)
*H04L 12/26* (2006.01)
*H04L 5/00* (2006.01)

(52) U.S. Cl.
CPC .......... *H04L 43/067* (2013.01); *H04L 5/0055* (2013.01); *H04L 43/065* (2013.01)

(58) Field of Classification Search
CPC combination set(s) only.
See application file for complete search history.

(56) References Cited

U.S. PATENT DOCUMENTS

| 9,226,260 B2 * | 12/2015 | Steiner ................. H04W 64/00 |
| 9,560,620 B2 * | 1/2017 | Aldana ................. H04W 64/00 |
| 2014/0073352 A1 * | 3/2014 | Aldana ..................... G01S 5/10 455/456.1 |
| 2016/0255471 A1 * | 9/2016 | Marri Sridhar ...... H04B 17/318 455/456.2 |

* cited by examiner

*Primary Examiner* — Frank Duong
(74) *Attorney, Agent, or Firm* — Winston Hsu

(57) ABSTRACT

A wireless communication method includes: sending a request frame to a responder, wherein the request frame includes a first message arranged to indicate what information the initiator supports; receiving a measurement frame from a responder, wherein the measurement frame includes a second message arranged to indicate what information the responder requires; and sending a report frame to the responder, wherein the report frame includes the information the responder requires.

16 Claims, 5 Drawing Sheets

| Reverse report availability | Timing report support | Ranging report support | Location report support |
|---|---|---|---|
| B3 | B2 | B1 | B0 |

MSG1

| Required timing report | Required ranging report | Required location report |
|---|---|---|
| B2' | B1' | B0' |

WIRELESS COMMUNICATION METHOD SUPPORTING REVERSE REPORT AND RELATED WIRELESS COMMUNICATION SYSTEM

CROSS REFERENCE TO RELATED APPLICATIONS

This application claims the benefit of U.S. provisional application No. 62/128,530 filed on Mar. 5, 2015 and incorporated herein by reference.

BACKGROUND

The present invention relates to wireless communication, and more particularly, to a wireless communication method supporting a reverse report and a related wireless communication system.

IEEE 802.11 is a set of media access control (MAC) and physical layer (PHY) specifications for implementing wireless local area network (WLAN) computer communication in the 2.4, 3.6, 5, and 60 GHz frequency bands, which are created and maintained by the IEEE LAN/MAN Standards Committee (IEEE 802). The base version of the standard was released in 1997; since then, there have been some amendments. The original standard together with subsequent amendments provides the basis for wireless network products using the Wi-Fi brand. While each amendment is officially revoked when it is incorporated into the latest version of the standard, the corporate world tends to market to the revisions as these concisely denote capabilities of their products. As a result, in the market place, each revision tends to become its own standard.

In the 802.11v and 802.11mc standards, a scheme for calculating clock offset or time of flight between two stations in order to derive the distance between the two stations according to "spec 802.11 2012 FIG. 10-23" is introduced.

FIG. 1 is a diagram illustrating the communicating progress of a conventional wireless communication system. The wireless communication system 100 comprises an initiator 101 and a responder 102. Conventionally, the initiator 101 may be a phone station, and the responder 102 may be an access point. In order to calculate the time of flight, the initiator 101 sends a request frame RF1 to the responder 102 to notify the responder 102 and receives an acknowledgement ACKrf1 from the responder 102. Next, the responder 102 sends a measurement frame MF11 at a departure time t1 which arrives at the initiator 101 at an arrival time t2, and an acknowledgement ACK11 is sent from the initiator 101 at a departure time t3 which arrives at the responder 102 at an arrival time t4. The responder 102 sends a measurement frame MF12 which comprises the information about the departure time t1 of the measurement frame MF1 and the arrival time t4 of the acknowledgement ACK1 to the initiator 101 for further processing. An acknowledgement ACK12 corresponding to the measurement frame MF12 is then sent to the responder 102 from the initiator 101.

It should be observed that the conventional wireless communication method is a unidirectional handshake to obtain all required timing parameters for clock offset, timing synchronization or round-trip time calculation, which consumes more power if the responder 102 has to re-initiate one more handshake to obtain information from the initiator 101. For example, in a peer-to-peer scenario such as gaming/social network, the initiator 101 requests timing measurement handshake for ranging while the responder 102 would like to acquire the distance to the initiator. In another example, for a commercial network such as a mall, the initiator 101 requests timing measurement handshake for location while the responder 102 would like to collect the distance of the initiator 101 to a server for location-based service.

SUMMARY

One of the objectives of the present invention is to provide a wireless communication method supporting a reverse report and a related wireless communication system to solve the problems mentioned above.

According to an embodiment of the present invention, a wireless communication method employed by an initiator is disclosed, wherein the method comprises: sending a request frame to a responder, wherein the request frame comprises a first message arranged to indicate what information the initiator supports; receiving a measurement frame from a responder, wherein the measurement frame comprises a second message arranged to indicate what information the responder requires; and sending a report frame to the responder, wherein the report frame comprises the information the responder requires.

According to an embodiment of the present invention, a wireless communication method employed by a responder is disclosed, wherein the method comprises: receiving a request frame from an initiator, wherein the request frame comprises a first message arranged to indicate what information the initiator supports; sending a measurement frame to the initiator, wherein the measurement frame comprises a second message arranged to indicate what information the responder requires; and receiving a report frame from the initiator, wherein the report frame comprises the information the responder requires.

According to an embodiment of the present invention, a wireless communication system is disclosed, wherein the system comprises an initiator and a responder. The responder is arranged to send a measurement frame to the initiator after receiving a request frame from the initiator, and the initiator is arranged to send a report frame to the responder after receiving the measurement frame. The request frame comprises a first message for indicating what information the initiator supports, the measurement frame comprises a second message for indicating what information the responder requires, and the report frame comprises the information the responder requires.

According to an embodiment of the present invention, a wireless communication method is disclosed, wherein the method comprises: sending a measurement frame to an initiator after receiving a request frame from the initiator; and sending a report frame to a responder after receiving the measurement frame. The request frame comprises a first message arranged for indicating what information the initiator supports, the measurement frame comprises a second message arranged for indicating what information the responder requires from the initiator, and the report frame comprises the information the responder requires.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should not be interpreted as a close-ended term such as "consist of". Also, the term "couple" is intended to mean either an indirect or direct electrical connection. Accordingly, if one device is coupled to another device, that connection may be through a direct electrical connection, or through an indirect electrical connection via other devices and connections.

Figure 1:
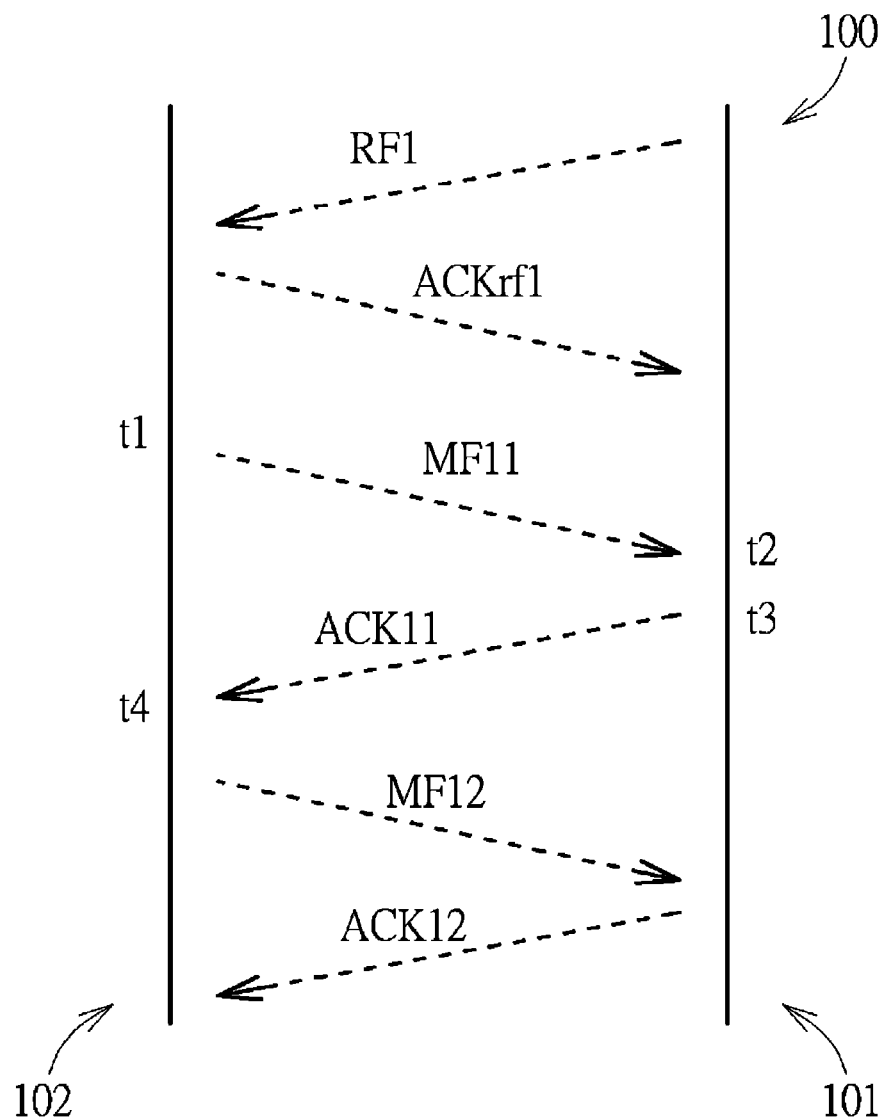
FIG. 1 is a diagram illustrating a communicating progress of a conventional wireless communication system.
Figure 2:
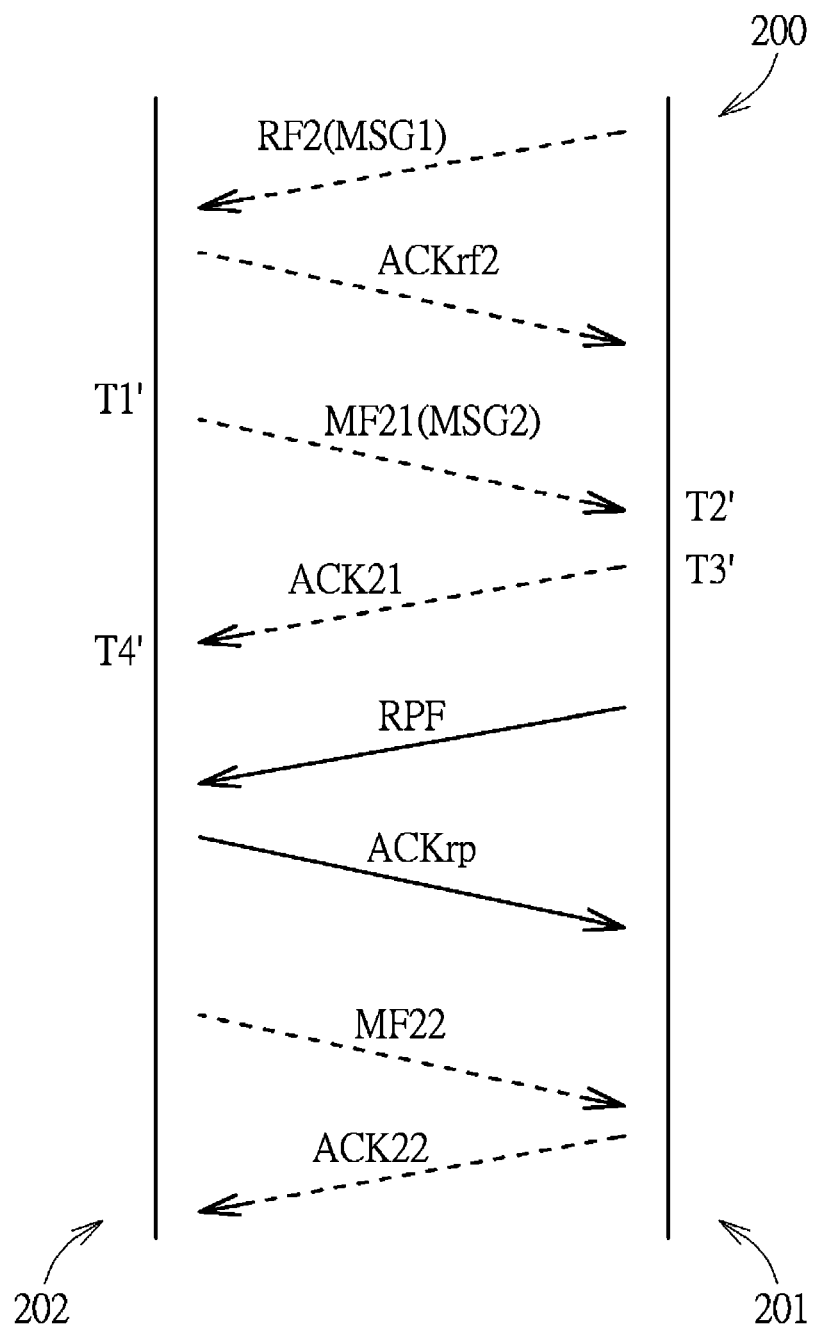
FIG. 2 is a diagram illustrating a communicating progress of a wireless communication system according to an embodiment of the present invention.

FIG. 2 is a diagram illustrating the communicating progress of a wireless communication system 200 according to an embodiment of the present invention. The wireless communication system 200 includes an initiator 201 and a responder 202. In one exemplary implementation, the initiator 201 may be a phone station and the responder may be an access point. This is not meant to be a limitation of the present invention. In practice, any wireless communication system using the proposed reverse report falls within the scope of the present invention. The initiator 201 sends a request frame RF2 to the responder 202 in which a first message MSG1 is comprised, and receives an acknowledgement ACKrf2 from the responder 202.

Figure 3:
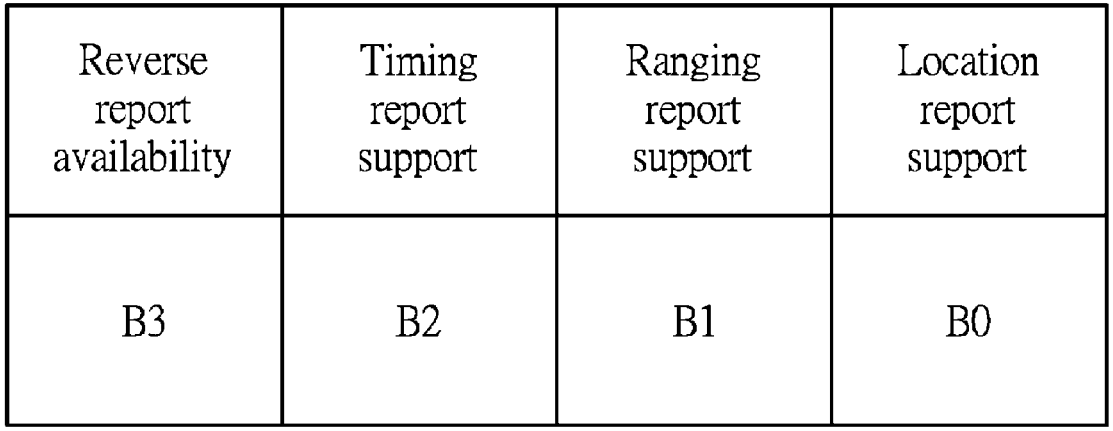
FIG. 3 is a diagram illustrating a data format of a first message according to an embodiment of the present invention.

FIG. 3 is a diagram illustrating a data format of the first message MSG1 according to an embodiment of the present invention. In this embodiment, the first message MSG1 is represented by a plurality of bits B0, B1, B2, B3, wherein one of the plurality of bits is a reverse report availability bit B3 for indicating whether the initiator 201 supports a reverse report to transfer some desirable information for the responder 202. For example, if the reverse report availability bit B3 is logic value "1", the responder 202 is notified that the initiator 201 is qualified to support a reverse report feature; if the reverse report availability bit B3 is logic value "0", the initiator 201 is not capable of supporting the reverse report feature. The remaining plurality of bits is arranged for notifying the responder 202 what type of reports it supports. As an example but not a limitation of the present invention, a timing report is used to inform the responder 202 of the departure time or the arrival time of the frames it sends or it receives, a ranging report is used to inform the responder 202 of the distance between the initiator and the responder, and a location report is used to inform the responder of the accurate location of the initiator. The timing report support bit B2 indicates whether the timing report is supported, the ranging report support bit B1 indicates whether the ranging report is supported, and the location report support bit B0 indicates whether the location report is supported. In this embodiment, the first message MSG1 is represented by a plurality of bits which are reserved bits in the frame to indicate the reports it supports. The invention is not limited thereto. As long as the first message MSG1 in the request frame RF2 can inform the responder 202 of what type of report the initiator 201 supports, any feasible design should fall within the scope of the present invention.

Figure 4:
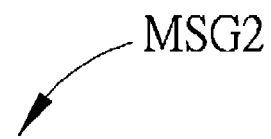
FIG. 4 is a diagram illustrating a data format of a second message according to an embodiment of the present invention.

The responder 202 sends a measurement frame MF21 at a departure time t1' in which a second message MSG2 is used for notifying the initiator as to what report(s) supported by the initiator 201 are required. As in the first message MSG1, the second message MSG2 may be represented by a plurality of bits. FIG. 4 is a diagram illustrating a data format of the second message MSG2 according to an embodiment of the present invention. In the case where that the initiator 201 supports the timing report and notifies the responder 202 with the request frame RF2, if the responder 202 requires the timing report, the responder 202 utilizes a required timing report bit B2' with a logic value "1" to claim its need to the initiator 201. In the case where the initiator 201 supports the ranging report and notifies the responder 202 with the request frame RF2, if the responder 202 requires the ranging report, the responder 202 utilizes a required ranging report bit B1' with a logic value "1" to claim its need to the initiator 201. In the case where the initiator 201 supports the location report and notifies the responder 202 with the request frame RF2, if the responder 202 requires the location report, the responder 202 utilizes a required location report bit B0' with a logic value "1" to claim its need to the initiator 201. In this embodiment, the second message MAG2 may be represented by a plurality of bits which are reserved bits in the frame to indicate the report(s) it requires. This is not limited thereto. As long as the second message MSG2 in the measurement frame MF21 can inform the initiator 201 what type of report the responder 202 requires, any feasible design should fall within the scope of the present invention.

The initiator 201 receives the measurement frame MF21 at an arrival time t2' and identifies the requirements of the responder 202 according to the second message MSG2, and then an acknowledgement ACK21 is sent to the responder 202 which leaves the initiator 201 at a departure time t3' and arrives at the responder 202 at an arrival time t4'.

A report frame RPF is sent to the responder 202 from the initiator 201, wherein the report frame RPF carries the information that the responder 202 requested in the measurement frame MF21, for example, the accurate location of the initiator 201, or the arrival time t2' and the departure time t3' to calculate the time of flight or clock offset. An acknowledgement ACKrp corresponding to the report frame RPF is then sent from the responder 202 to the initiator 201. A measurement frame MF22 is transferred to the initiator 201 from the responder 202 with the information of the departure time t1' and the arrival time t4'.

The measurement frame MF21 and the report frame RPF both contain a dialog token as an identity. In this way, the responder 202 can learn which measurement frame the report frame corresponds to when the responder 202 receives the report frame.

Figure 5:
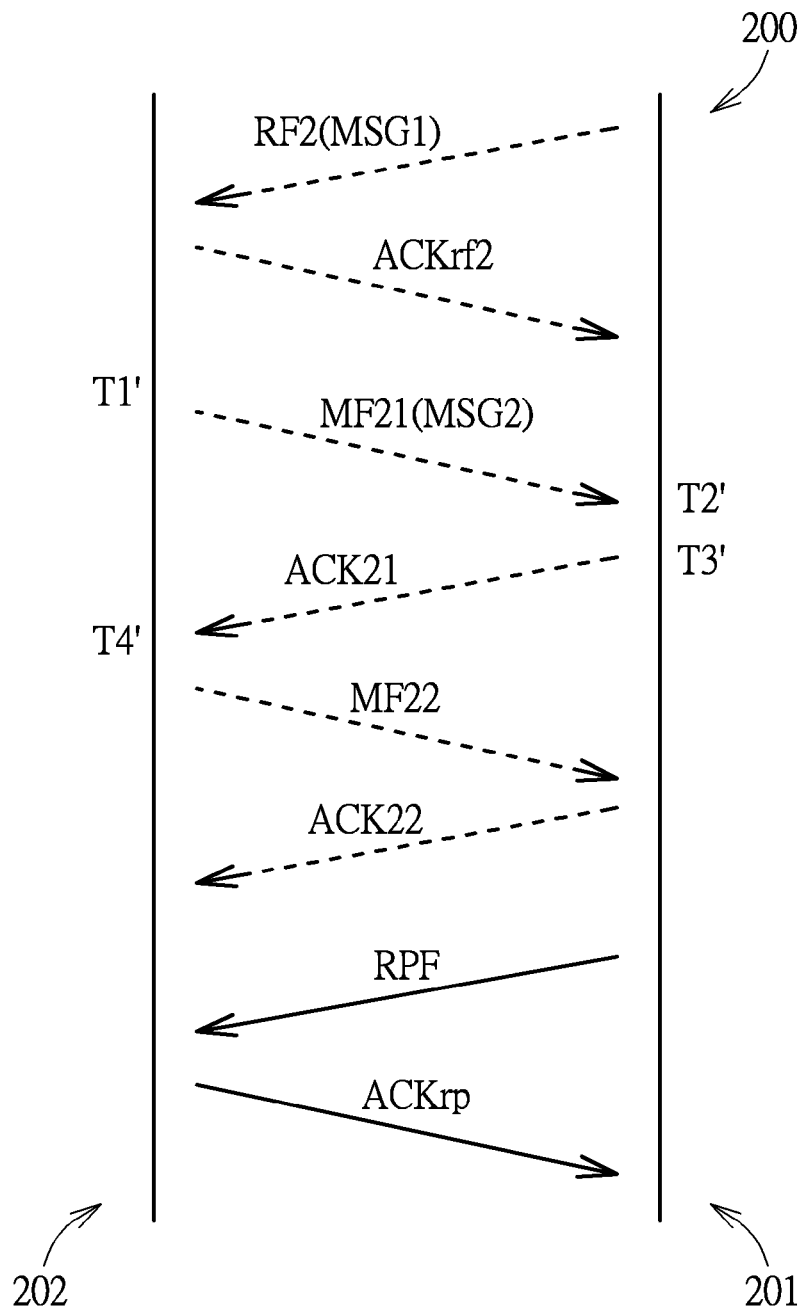
FIG. 5 is a diagram illustrating an alternative communicating progress of a wireless communication system according to an embodiment of the present invention.

It should be noted that the report frame RPF sent by the initiator 201 is not limited to be sent before the measurement frame MF2, as shown in FIG. 2. In other embodiments, the report frame RPF carrying the information requested by the responder 202 may be sent after an acknowledgement ACK22 corresponding to the measurement frame MF22 is received by the responder 202, as shown in FIG. 5. These alternative designs should fall within the scope of the present invention.

Embodiments of the present invention provide an inventive method for wireless communication. For example, the responder can obtain the information it requires in only one unidirectional handshake without proposing another handshake. As shown in FIG. 2 and FIG. 5, the information can be obtained for both the initiator and the responder in one handshake process. Statistically, for both the initiator and responder to obtain the required information, this method can save four steps as compared to the prior art. Therefore, the proposed method provides power-saving for wireless communication.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless communication method employed by an initiator, comprising:
   sending a request frame to a responder, wherein the request frame comprises a first message arranged to indicate information supported by the initiator, and the information supported by the initiator comprises at least one of a timing report, a ranging report and a location report;
   receiving a measurement frame from the responder, wherein the measurement frame comprises a second message arranged to indicate information required by the responder, and the information required by the responder comprises at least one of the timing report, the ranging report and the location report; and
   sending a report frame to the responder, wherein the report frame comprises the information required by the responder.

2. The wireless communication method of claim 1, wherein the first message is represented by at least one bit arranged to indicate whether a predetermined report type is supported by the initiator.

3. The wireless communication method of claim 1, wherein the second message is represented by at least one bit arranged to indicate whether a predetermined report type is required by the responder.

4. The wireless communication method of claim 1, wherein the initiator is a station and the responder is an access point or a station.

5. A wireless communication method employed by a responder, comprising:
   receiving a request frame from an initiator, wherein the request frame comprises a first message arranged to indicate information supported by the initiator, and the information supported by the initiator comprises at least one of a timing report, a ranging report and a location report;
   sending a measurement frame to the initiator, wherein the measurement frame comprises a second message arranged to indicate information required by the responder, and the information required by the responder comprises at least one of the timing report, the ranging report and the location report; and
   receiving a report frame from the initiator, wherein the report frame comprises the information required by the responder.

6. The wireless communication method of claim 5, wherein the initiator is a station and the responder is an access point or a station.

7. The wireless communication method of claim 5, wherein the first message is represented by at least one bit arranged to indicate whether a predetermined report type is supported by the initiator.

8. The wireless communication method of claim 5, wherein the second message is represented by at least one bit arranged to indicate whether a predetermined report type is required by the responder.

9. A wireless communication system, comprising:
   an initiator; and
   a responder;
   wherein the responder is arranged to send a measurement frame to the initiator after receiving a request frame from the initiator, and the initiator is arranged to send a report frame to the responder after receiving the measurement frame; the request frame comprises a first message for indicating information supported by the initiator, and the information supported by the initiator comprises at least one of a timing report, a ranging report and a location report, the measurement frame comprises a second message for indicating information required by the responder, and the information required by the responder comprises at least one of the timing report, the ranging report and the location report, and the report frame comprises the information required by the responder.

10. The wireless communication method of claim 9, wherein the second message is represented by at least one bit arranged to indicate whether a predetermined report type is required by the responder.

11. The wireless communication method of claim 9, wherein the initiator is a station and the responder is an access point.

12. The wireless communication system of claim 9, wherein the first message is represented by at least one bit arranged to indicate whether a predetermined report type is supported by the initiator.

13. A wireless communication method, comprising:
   sending a measurement frame to an initiator after receiving a request frame from the initiator; and
   sending a report frame to a responder after receiving the measurement frame;
   wherein the request frame comprises a first message for indicating information supported by the initiator, and the information supported by the initiator comprises at least one of a timing report, a ranging report and a location report, the measurement frame comprises a second message for indicating information required by the responder, and the information required by the responder comprises at least one of the timing report, the ranging report and the location report, and the report frame comprises the information required by the responder.

14. The wireless communication method of claim 13, wherein the first message is represented by at least one bit arranged to indicate whether a predetermined report type is supported by the initiator.

15. The wireless communication method of claim 13, wherein the second message is represented by at least one bit arranged to indicate whether a predetermined report type is required by the responder.

16. The wireless communication method of claim 13, wherein the initiator is a station and the responder is an access point.

* * * * *